Figure 1:
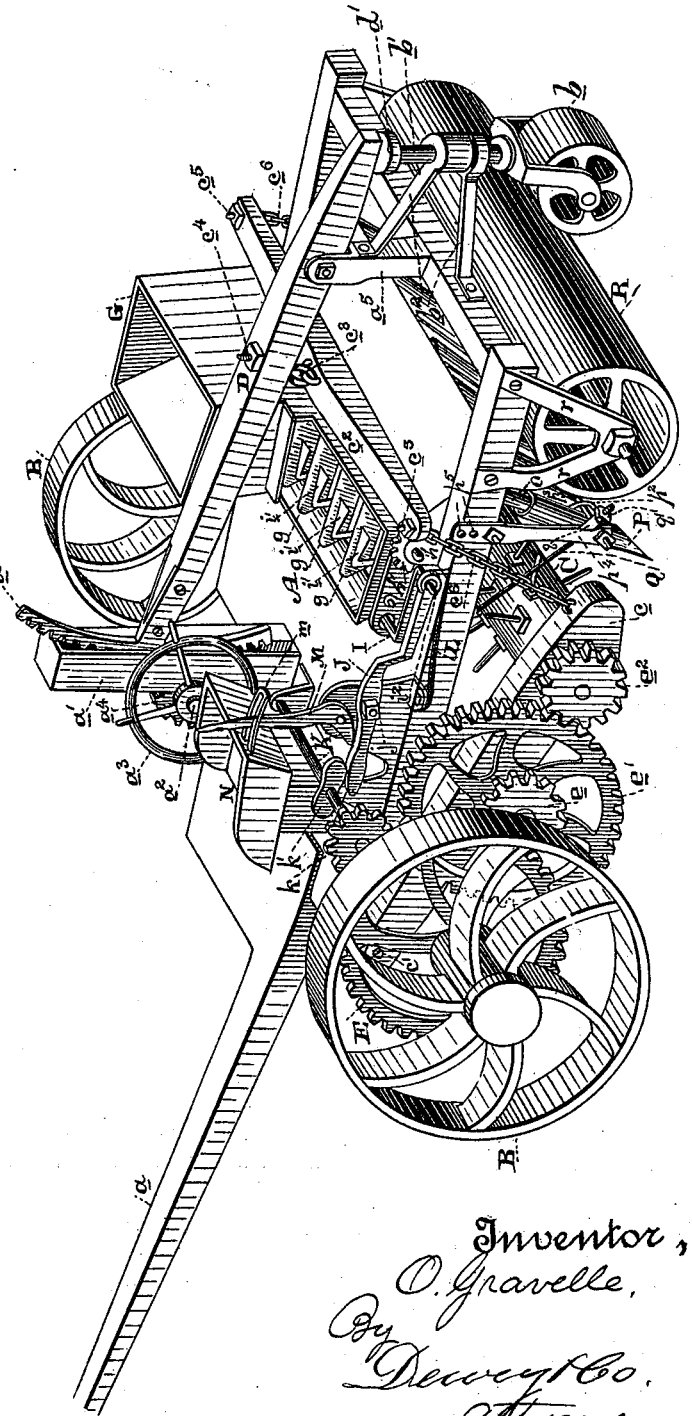

(No Model.)  2 Sheets—Sheet 1.
O. GRAVELLE.
COMBINED HARROW, SEEDER, AND ROLLER.

No. 339,763. Patented Apr. 13, 1886.

Witnesses,
Geo. H. Strong.
J. H. Towne.

Inventor,
O. Gravelle,
By Dewey & Co.
Attorney (No Model.) 2 Sheets—Sheet 2.
O. GRAVELLE.
COMBINED HARROW, SEEDER, AND ROLLER.
No. 339,763. Patented Apr. 13, 1886.
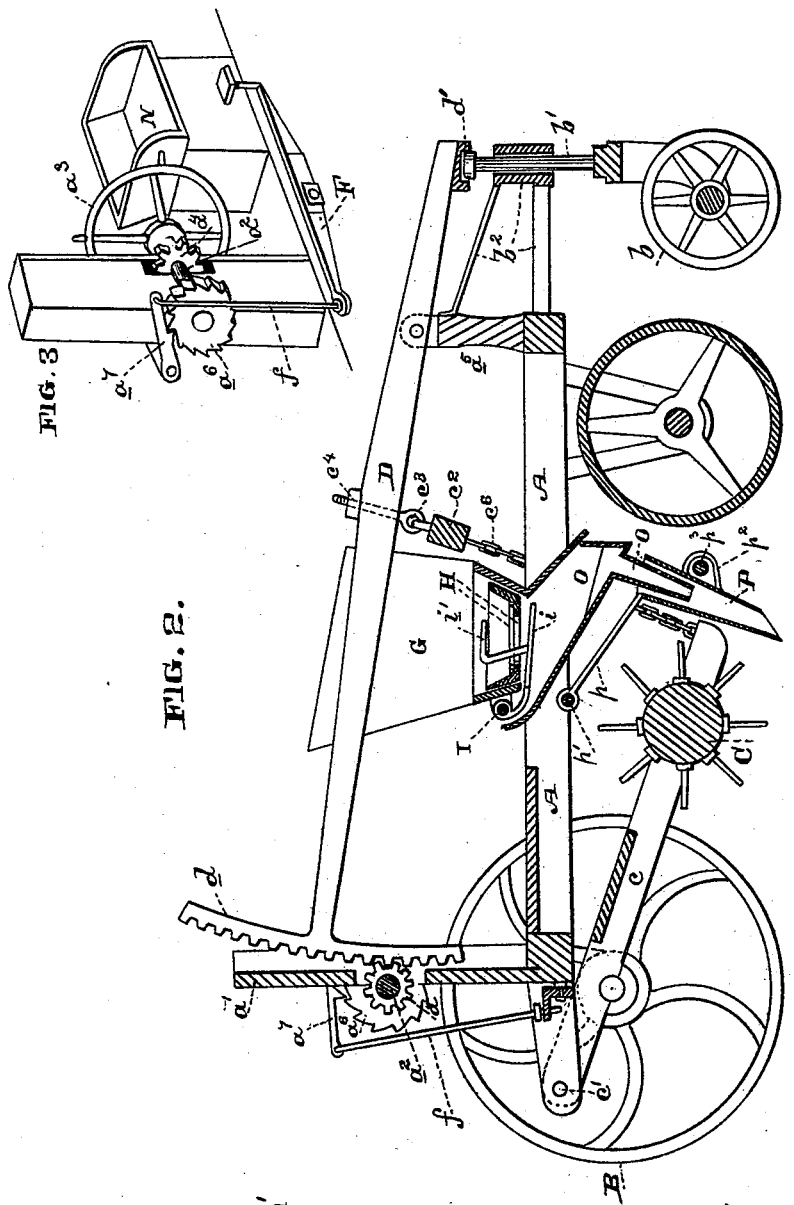
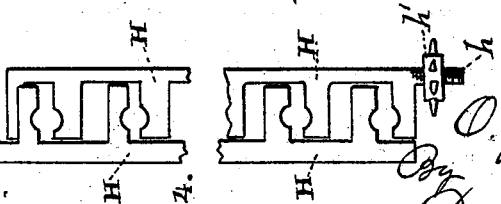
Witnesses,
Geo. H. Strong.
J. H. Nourse.
Inventor
O. Gravelle
By
Dewey & Co.
Attorneys

UNITED STATES PATENT OFFICE.

OCTAVE GRAVELLE, OF GARFIELD, NEVADA.

COMBINED HARROW, SEEDER, AND ROLLER.

SPECIFICATION forming part of Letters Patent No. 339,763, dated April 13, 1886.

Application filed August 24, 1885. Serial No. 175,251. (No model.)

*To all whom it may concern:*

Be it known that I, OCTAVE GRAVELLE, of Garfield, Esmeralda county, State of Nevada, have invented an Improvement in a Combined Harrow, Seeder, and Roller; and I hereby declare the following to be a full, clear, and exact description of the same.

My invention relates to the class of agricultural implements which, by the combination of various parts, are adapted to harrow, sow, and roll; and my invention consists in a wheeled frame, to which is pivoted arms which carry a harrow extending transversely under the frame. On the top of the frame is a seed-box, which communicates with suitably-arranged drills. Behind the harrow and under the rear of the frame is mounted a roller.

My invention further consists in the mechanism by which the rotation is imparted to the harrow and by which it is vertically adjusted, in the mechanism by which the seeding device is regulated and by which its drills are adjusted, in peculiar mechanism by which the harrow, the drills, and the roller are all elevated, so that the machine will travel on its three wheels, and in various details of construction, all of which I shall hereinafter fully explain.

The object of my invention is to provide a simple and effective machine adapted for the purpose of harrowing, sowing, and rolling, and which at the same time may be readily handled.

Referring to the accompanying drawings, Figure 1 is a perspective view of my combined harrow, seeder, and roller, one of the hoppers of the seed-box being removed. Fig. 2 is a vertical longitudinal section of same. Fig. 3 is a perspective detail of the adjusting mechanism in front. Fig. 4 is a plan of the feed-regulating plates of the seed-box.

A is the main frame, provided with a tongue, $a$, and mounted in front of the wheels B, one of which is the driving or bull wheel. At its rear it is mounted on a steering-wheel, $b$. Under the frame is the harrow C, consisting of a cylindrical head provided with radial teeth. This harrow is journaled in the lower ends of arms $c$, the upper ends of which are pivoted to the front of the main frame at $c'$.

The harrow is adapted to be vertically adjusted by the following mechanism: On the front of the frame is a post, $a'$, in which is mounted a shaft, $a^2$, carrying a crank-wheel, $a^3$, and a pinion, $a^4$. On the rear of the main frame is a post, $a^5$, in which is pivoted a lever, D, the forward end of which is provided with a segmental rack, $d$, engaging the pinion $a^4$. The rear end of the lever is provided with a circular socketed plate, $d'$, in which rests loosely and turns freely the head of the spindle $b'$ of the steering-wheel $b$, said spindle being loosely mounted in a bracket, $b^2$, on the rear of the main frame and adapted to move up and down therein.

$c^2$ is a bar which is connected with the lever D by a link, $c^3$, which engages the eye of an adjustable screw-bolt, $c^4$, which passes through the lever D. The ends of this bar have eye-bolts $c^5$, to which are secured chains $c^6$, the lower ends of which are attached to the rear ends of the arms $c$ of the harrow. By operating the crank-wheel $a^3$, which transmits power through the pinion $a^4$ to the rack $d$, the lever D is raised or lowered, thus raising or lowering, through the bar $c^2$ and chains $c^6$, the arms $c$ of the harrow. The limits of this adjustment can be varied by setting out or in the screw-bolts $c^4$ $c^5$.

Rotation is imparted to the harrow by means of a spur-gear, E, on the axle of the bull-wheel, which said gear meshes with a pinion, $e$, on a shaft carrying a large gear, $e'$, which meshes with a pinion, $e^2$, on the end of the harrow-shaft.

In order to hold the harrow in the position to which it may be adjusted, I have a ratchet-wheel, $a^6$, on the shaft $a^2$, with which a pivoted pawl, $a^7$, engages, this pawl being normally in engagement and released by means of the foot-lever F, which is connected with the pawl by the rod $f$.

Across the center of the frame is mounted the seed-box G, which may consist of one or more hoppers, preferably two, separated in the middle to permit the lever D to operate between them. In the bottom or throat of the hopper or seed-box are transverse ribs or divisions $g$. Secured in suitable guides under the throat of the hopper are the notched or grooved plates H, lying in parallel planes the one on the other. These plates are provided with short stems $h$ on opposite ends, passing out through the ends of the seed-box and threaded to adapt them to receive thumb-nuts $h'$, by which each plate may be moved longitudinally and in opposite directions. This movement causes the notches of the plates to coincide more or less, whereby greater or smaller apertures are provided for the discharge of the seed.

On the front of the seed-box, near its base, is pivoted a shaft, I, having arms $i$, passing under the plates H of the seed-box, and provided with upwardly-extending bent fingers $i'$, which pass through the spaces formed by the notches of the plates H and enter the throat of the seed-box between the transverse ribs therein.

One end of the shaft I is cranked at $i^2$, and is connected with a lever, J, pivoted at $j$. On a short counter-shaft, K, is a pinion, $k$, which meshes with the spur-gear E. This shaft also carries a double cam, $k'$, of a figure 8 shape, approximately, which is adapted in its revolution to bear on the forward end of the pivoted lever J. In this way said lever is oscillated, whereby the shaft I is also oscillated, and the fingers $i'$ are moved vertically in the throat of the hopper.

A spring, L, holds the lever J to its impingement with the rotating cam-wheel. In order to throw it out of said impingement and hold it, I have the pivoted cam-lever M, the lower end of which bears on the forward end of lever J, and its upper end engages with a rack, $m$, secured on the rear of the seat N. Under the arms $i$, which serve as guides for the seed, is a chute, O, in the bottom of which are the discharge-pipes $o$. These pipes enter the drills P, which are each mounted on the arms $p$, the upper ends of which are sleeved or pivoted on a transverse shaft, $p'$, mounted under the main frame.

On the rear of the drills are the slotted guides or staples $p^2$, which are fitted on a transverse shaft, $p^3$, mounted in the lower ends of hangers $p^4$, secured to the main frame, and adapted to be vertically adjusted by means of their screw-bolts entering any of the series of holes $p^5$ in said hangers. Q are inclined rods, which are pivoted on the transverse shaft $p^3$ and pass through sockets $q$ on the hangers, and receive nuts $q'$ on their ends. By setting up these nuts the hangers may be adjusted to a suitable inclination in order to adjust the inclination of the drills. R is the roller, mounted on brackets $r$ at the rear of the frame. It will be observed that the lever D, by being raised or lowered and bearing with its rear end on the spindle $b'$ of the steering-wheel $b$, is adapted not only to vertically adjust the harrow, as heretofore described, but also, when desired, to raise the entire frame, thus lifting the harrow, the drills, and the roller from the ground, and the frame is carried on its three wheels.

Although I have here shown a seeding device of the class known as "drills," I could make it a broadcast seeder by removing the chute O with its discharge-pipes and the drills, and using the rear plate of the chute (which is made readily removable) as a discharge-plate adapted to direct the seed from the arms $i$ forwardly onto the harrow.

The operation of my machine is as follows: It is intended that the harrow shall be so adjusted that its teeth shall not project very far into the ground, but shall merely scratch it. This allows me, by means of the gearing described, to impart to it a very rapid motion. The seed which is placed in the seed-box is fed by means of the vertically-reciprocating fingers $i'$ down through the openings formed by the notches of the plates H, (the capacity of said openings being regulated by the movement of the plates,) and falling on the arms $i$ are directed by them into the chute O, and thence through their discharge-pipes $o$ into the drills P, by which they are drilled into the ground. This drilling takes place just behind the harrow, so that the earth being loose drops over and covers the drill-holes, the roller following presses and leaves the ground in shape. When the operation is complete, the lever D is moved to raise the entire machine on its three wheels, so that it is readily transportable.

Having thus described my invention, what I claim as new, and desire to secure by Letters Patent, is—

1. In a combined harrow, seeder, and roller, the main frame and a seeder and roller carried by the frame, in combination with the harrow C, located in front of the seeder, suitable gearing, operated by the travel of the machine, to rotate the harrow, the arms $c$, pivoted to the front of the machine, and in the rear ends of which the harrow is mounted, a pivoted lever, D, and suitable chains connecting the rear ends of the arms with the lever, whereby the harrow is vertically adjustable, substantially as herein described.

2. In a combined harrow, seeder, and roller, the main frame A and a seeder and roller carried by the frame, in combination with the harrow C, consisting of a rotating toothed cylinder-head, the arms $c$, pivoted to the front of the main frame and carrying the harrow, and the means by which the harrow is vertically adjusted, consisting of the pivoted lever D, having a segmental rack, $d$, the shaft $a^3$, having a crank-wheel, $a^3$, and a pinion, $a^4$, meshing with the rack, the bar $c^3$, secured to the lever D, and chains $c^6$, connecting the rear ends of the arms $c$ with the ends of the bar, substantially as herein described.

3. In a combined harrow, seeder, and roller, the wheeled frame A, in combination with the rotating harrow C and the pivoted arms $c$, by which it is carried, the pivoted lever D, operated by a rack and pinion, as described, and the adjustable connection between said lever and the arms $c$ of the harrow, consisting of the eyebolts $c^4$ $c^5$ in the lever and bar, the link $c^3$, connecting the bar with the eyebolt $c^4$, and the chains $c^6$, connecting the rear ends of the arms $c$ with the eyebolts $c^5$ in the ends of the bar, substantially as herein described.

4. In a combined harrow, seeder, and roller, the main wheeled frame A, in combination with the harrow C and the pivoted arms c, in which it is mounted, the pivoted lever D, operated by the rack and pinion and crank-wheel, as described, the bar $c^2$, connected with the lever, and the chains $c^6$, connecting the rear ends of the arms c with the ends of the bar, whereby the harrow is adjusted, and the means by which the harrow is held in the position to which it is adjusted, consisting of the ratchet-wheel $a^6$ on the crank-wheel shaft $a^2$, the foot-lever F, and connecting-rod $f$, all arranged and operating substantially as herein described.

5. In a combined harrow, seeder, and roller, the seed-box G, having the notched adjustable plates H under its throat, for regulating its feed, in combination with the pivoted transverse shaft I, having arms $i$ and fingers $i'$ extending upwardly through the notches of the plates H into the throat of the seed-box, and a means, comprising a lever and operating-cam, for oscillating the shaft I, whereby the fingers are vertically reciprocated, substantially as herein described.

6. In a combined harrow, seeder, and roller, the main wheeled frame A, in combination with the seed-box G, having notched and adjustable feed-regulating plates H under its throat, the pivoted crank-shaft I, having arms $i$ and fingers $i'$ extending upwardly through the notches of the plates H into the throat of the seed-box, and the means by which the fingers are vertically reciprocated, consisting of the pivoted lever J on the crank-shaft I, the cam $k'$ on the counter-shaft K, the pinion $k$ on said shaft, and the spur-gear E on the axle of the driving-wheel of the main frame, substantially as herein described.

7. In a combined harrow, seeder, and roller, the main frame A, in combination with the seed-box G, having the notched adjustable feed-regulating plates H under its throat, the crank-shaft I, having arms $i$ and fingers $i'$ extending upwardly through the notches of the plates H into the throat of the seed-box, the means by which the fingers are vertically reciprocated, consisting of the lever J, attached to the crank-shaft I, the cam $k'$, and pinion $k$ on the counter-shaft K, the spur-gear E, and the spring L, and the means by which the lever J is thrown out of contact with the cam, consisting of the pivoted cam-lever M, substantially as herein described.

8. In a combined harrow, seeder, and roller, the seed-box G, in combination with the chute O, having discharge-pipes $o$, and the drills P, fitted on said pipes, the arms $p$ of said drills pivoted on a cross-shaft, $p'$, the guide-staples $p^2$ of said drills fitted on a cross-shaft, $p^3$, the adjustable hangers $p^4$, supporting said shaft, and the adjustable diagonal rods Q between the hangers and the cross-shaft, substantially as herein described.

9. In a combined harrow, seeder, and roller, the main frame A, having wheels B $b$, the harrow C, the roller R, and the seeding mechanism supported by the frame and operating between the harrow and the roller, in combination with the means by which the frame A and the parts it supports are raised and carried on its wheels, consisting of the lever D, operated in front by a rack and a pinion and bearing with its rear end on the spindle of the steering-wheel $b$, substantially as herein described.

10. A combined harrow, seeder, and roller comprising the main frame A, having wheels B in front, and an adjustable steering-wheel, $b$, behind, the vertically-adjustable harrow C, mounted transversely under the frame, mechanism operated by the driving or traction wheel of the frame for rotating the harrow, the seed-box G on the frame, having adjustable feed-plates and vertically-reciprocating feed-fingers driven by the traction-wheel through suitable mechanism, the chute O and adjustable drills P behind the harrow, the roller R behind the drills and mounted under the frame, and the pivoted lever D, connected with the harrow and bearing on the spindle of the steering-wheel, all arranged and adapted to operate substantially as herein described.

In witness whereof I have hereunto set my hand.

OCTAVE GRAVELLE.

Witnesses:
S. H. NOURSE,
H. C. LEE.